United States Patent
Gelber

[11] 3,972,590
[45] Aug. 3, 1976

[54] DISPLAY DEVICE WHICH CHANGES COLOR AND METHOD

[75] Inventor: Robert M. Gelber, Healdsburg, Calif.

[73] Assignee: Optical Coating Laboratory, Inc., Santa Rosa, Calif.

[22] Filed: Sept. 17, 1973

[21] Appl. No.: 398,175

[52] U.S. Cl. ........................................ 350/160 LC
[51] Int. Cl.² ............................................ G02F 1/13
[58] Field of Search .............................. 350/160 LC

[56] References Cited
UNITED STATES PATENTS

| | | | |
|---|---|---|---|
| 3,569,614 | 3/1971 | Hanlon | 350/160 LC UX |
| 3,679,290 | 7/1972 | Adams et al. | 350/160 LC X |
| 3,680,950 | 8/1972 | Haas et al. | 350/160 LC X |
| 3,736,047 | 5/1973 | Gelber et al. | 350/160 LC |
| 3,785,721 | 1/1974 | Harsch | 350/160 LC X |
| 3,846,014 | 11/1974 | Aldrich et al. | 350/160 LC |

Primary Examiner—John K. Corbin
Assistant Examiner—Matthew W. Koren
Attorney, Agent, or Firm—Flehr, Hohbach, Test, Albritton & Herbert

[57] ABSTRACT

Display device which changes colors which has first and second spaced members with the first member being formed of an insulating material and being capable of transmitting light. Means is disposed between the first and second members for diffusing light. Means is carried by the second member which is capable of reflecting light. Means is provided on the first member which is capable of transmitting a certain spectral region of the light beam and for reflecting another spectral region of the light beam so that when the light beam passes through the means disposed between the first and second members and certain of the light is diffused, a color is imparted to the eye of the viewer.

20 Claims, 12 Drawing Figures

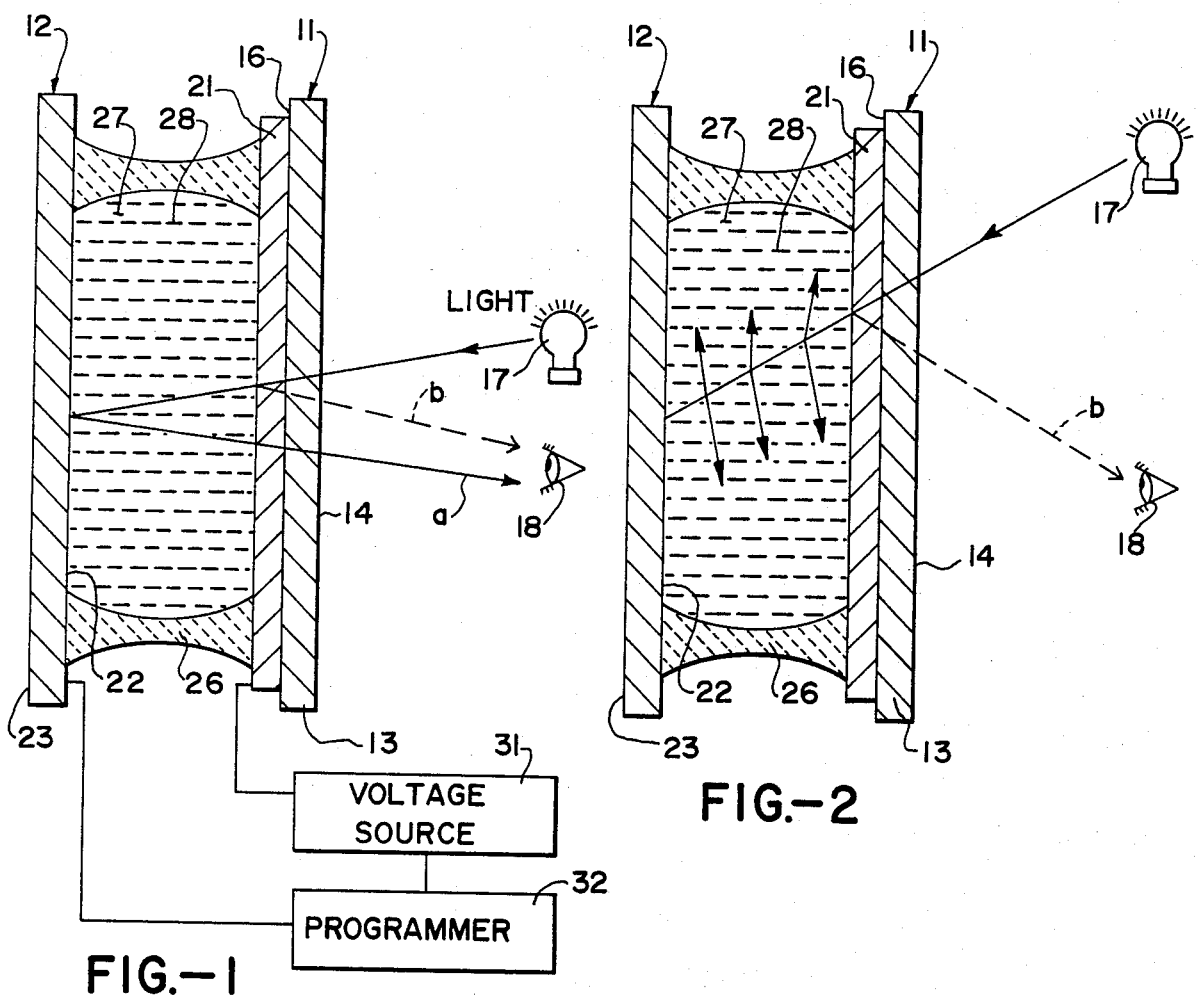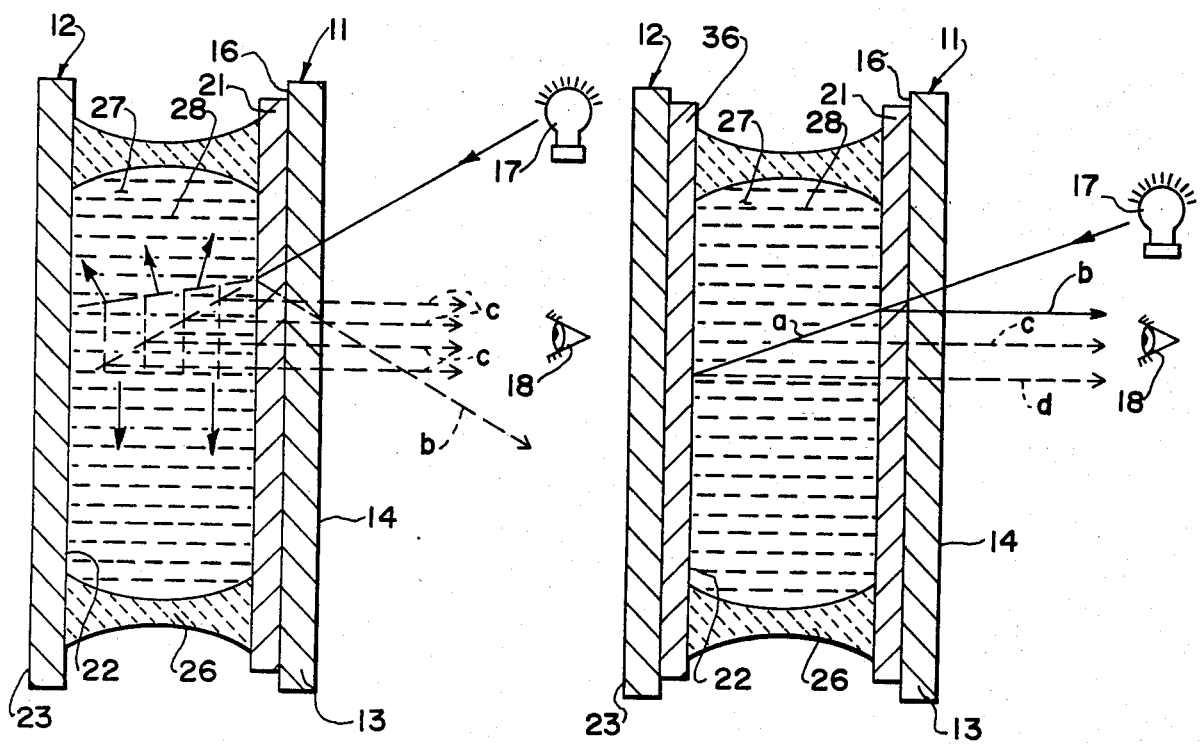

DISPLAY DEVICE WHICH CHANGES COLOR AND METHOD

BACKGROUND OF THE INVENTION

Attempts have heretofore been made to introduce color into liquid crystal displays. For example, an absorbing filter has been placed between the light source and the cell or the observer and the cell. The difficulty with such devices is that they have the same color when they are turned on as when they are turned off. Special liquid crystal materials have also been utilized in which color has been introduced into the dye in the molecule of the nematic liquid crystal material. These have the disadvantage that they require polarizing filters in addition to the liquid crystal cell, and are capable of producing only a single color in one cell.

There is, therefore, a need for a new and improved display device which is capable of producing more than one color in a single cell, and which changes color when activated and changes to another color when inactivated.

SUMMARY OF THE INVENTION AND OBJECTS

The optical display device consists of first and second spaced members with the first member being capable of transmitting light in the visible region onto the second member. Light reflecting means is carried by reflecting the light which is received from the first member. Means is disposed between the first and second members for diffusing at least some of the light passing from the first member to the second member. Means is carried by the first optical member for transmitting one spectral region of the light beam and for reflecting another spectral region of the light beam so that when a portion of the transmitting light beam is diffused, a change in color will be apparent to the viewer.

In general, it is an object of the present invention to provide a display device and method in which a color change takes place upon activation.

Another object of the invention is to provide a device and method of the above character in which operation in a diffuse mode and a specular mode can be achieved.

Another object of the invention is to provide a device and method of the above character which will operate in a diffuse mode to give the color of transmission of the first member.

Another object of the invention is to provide a device and method of the above character which when operating in the specular mode will give the color of the reflection of the first member.

Another object of the invention is to provide a device and method of the above character which is capable of producing multiple colors in a single cell.

Another object of the invention is to provide a device and method of the above character which will repeatedly change color when it is activated and inactivated.

Another object of the invention is to provide a device and method of the above character which is particularly applicable to liquid crystal display devices.

Another object of the invention is to provide a device and method of the above character which can be utilized with various types of systems to introduce color contrast to facilitate viewing images.

Another object of the invention is to provide a device of the above character which is relatively simple and which can be economically fabricated.

Additional objects and features of the invention will appear from the following description in which the preferred embodiments are set forth in conjunction with the accompanying drawings.

BRIEF DESCRIPTION OF THE DRAWING

FIG. 1 is a cross-sectional view of a display device incorporating the present invention with a block diagram of the electrical circuitry utilized in conjunction therewith.

FIG. 2 is a view showing the display device in FIG. 1 as being viewed to observe the spectral mode of operation.

FIG. 3 is a view similar to FIG. 1 showing viewing of the display device to observe the diffuse mode of operation.

FIG. 4 is a cross-sectional view of a display device similar to FIG. 1 but utilizing a dichroic filter as the rear reflector.

DESCRIPTION OF PREFERRED EMBODIMENTS

Figure 5:
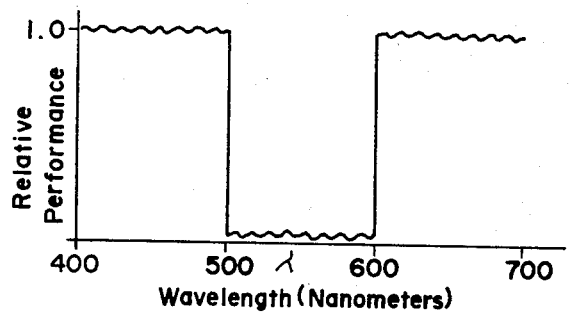
FIG. 5 is a curve showing the spectral performance (reflectance) of the dichroic filter of the rear member of the display device shown in FIG. 4.

The display device shown in FIG. 1 consists of first and second members or plates 11 and 12. The first member or plate 11 consists of a substrate or body 13 which is substantially transparent and which has insulative properties. One typical material which can be utilized for making the substrate or body 13 is soda lime glass having an index of refraction of approximately 1.52. It is provided with first and second planar, substantially parallel surfaces 14 and 16 in which the surface 14 faces the source of light indicated by the lamp 17 and also faces the viewer which is represented by the symbol 18. A combination coating 21 is provided on the surface 16 of the substrate 13 and consists of a dichroic reflector in the form of a multi-layer filter and a conductive coating thereon as hereinafter described.

The second member to be suitable for the present invention must have two characteristics. First, it must include at least a conducting coating or region and, in addition, it must be capable of reflecting at least a portion of the spectral region of visible light which is received through the first member 11. Typically, however, the second member is in the form of a total reflector, i.e. it reflects all colors which is white plus it must be conductive.

The member 12 can be called a back reflector and by way of example can be made of a "white" reflecting metal such as aluminum, chrome, nickel, silver, etc. In such cases, the metal also serves as the conducting layer for the liquid crystal cell. However, the back reflector can be formed on a dielectric substrate as, for example, glass on which there has been provided a conventional wide band dielectric reflecting coating. In such a case, a layer of conducting material such as a layer of indium oxide can be provided on top of the dielectric stack to provide a conducting layer for the liquid crystal cell.

In FIG. 1, a sheet of aluminum for the member 12 is provided with spaced parallel surfaces 22 and 23 in which the surface 22 is mirror-like so that it is a total or "white" reflector. The aluminum is also conductive so that it meets this requirement for the member 12. Alternatively, it should be appreciated that a substrate such as the glass substrate 13 could be utilized for the member 12 and that it could be provided with a coating or layer of aluminum on the surface 22 to provide the total or "white" reflector and the conducting coating which is required.

These coatings which are provided on the members 11 and 12 can have predetermined patterns which can be formed in the manner described in U.S. Pat. No. 3,736,047. As disclosed therein, a predetermined pattern can be provided on each of the first and second members 11 and 12.

U.S. Pat. No. 3,736,047 also discloses how the first and second members 11 and 12 can be bonded together to form a unitary assembly. Thus, as described therein, a glass frit can be utilized to provide a seal 26 which extends between the inner surfaces of the members 11 and 12 so that in combination with the members 11 and 12, an enclosed space or volume 27 is provided. The volume or space 27 is filled with a liquid crystal material 28 in a manner described in U.S. Pat. No. 3,736,047. Since the members or plates 11 and 12 are very close together, the liquid crystal material 28 is held between the first and second members 11 and 12 by capillary action.

The liquid crystal material can be of the type disclosed in U.S. Pat. No. 3,736,047 and preferably is of the nematic type which becomes cloudy upon the application of an electric field. However, as hereinafter pointed out, it is very possible that cholesteric type liquid crystal materials also can be utilized.

Means is provided for establishing an electric field in the liquid crystal material 28 and, as described in U.S. Pat. No. 3,736,047, can consist of a voltage source 31 which is connected to the conducting layer forming a part of the coating 21. When the display device carries a predetermined pattern which must be programmed, the voltage source is connected to a programmer 32 which is connected to the conducting coating carried by the second member or plate 12.

Operation of the display device shown in FIG. 1 may now be briefly described as follows. First, let it be assumed that the display device is in an inactive state, i.e., a voltage is not being applied between the conducting coatings carried by the members 11 and 12. In the inactivated mode, the display device or cell appears white or gives a silver, highly reflecting color which would be substantially identical to what would be given by the second member or back reflector 12. This, in spite of the fact that the coating 21 which is provided on the first or front member 11 is a dichroic filter which is strongly colored.

The reason for this is that the color in the dichroic filter results from reflection and not from absorption. To appreciate the significance of this fact, one must clearly understand how color is obtained from a dichroic filter. This is in contrast to other types of filters such as gelatin filters which work on the principle of absorption. By way of example, if such a filter has a red appearance, the reason it is red is because the filter absorbs the blue and the green spectral regions of light and transmits the red spectral region. The blue and the green information are absorbed by the filter and are dissipated as heat and hence the blue and the green information are irretrievably lost.

On the other hand, a dichroic filter which has a red appearance works in the opposite manner. It is red by transmission and the blue and the green information, rather than being absorbed and lost as heat, is reflected and, therefore, this blue and green information is recoverable.

Now let it be assumed that such a dichroic filter is placed in front of an aluminum mirror such as the member 12 provided in FIG. 1 but with no liquid crystal material between the same. Assuming that the dichroic filter is of a type which normally has an appearance of red, that is, the red information is transmitted, this red information strikes the totally reflective mirror surface of the aluminum layer and is reflected back through the dichroic filter where this information is recombined with the blue and the green to provide all the components of the white light so that it can be seen as soon as the dichroic filter is placed in front of a total reflector. The dichroic will be without color, i.e., it is white. Conversely, if a gelatin filter were utilized in the same application which transmits the red information, this red information will be reflected back but will have nothing to recombine with because the blue and the green information has been absorbed into the filter and has been lost and is irretrievable. Therefore, the gelatin filter continues to have the same color, i.e., red.

Now let it be assumed that the liquid crystal material is in place as previously described in conjunction with FIG. 1. When there is no electric field present in the liquid crystal material, the operation of the display device in the cell is identical to that hereinbefore described when there is no liquid crystal material present. Thus, whatever color is reflected by the dichroic filter, its complement is transmitted through the liquid crystal material 28, reflected by the total reflecting surface 27 back through the member 11 where it recombined with the color that was originally reflected by the dichroic filter to provide, as a result, a uniform reflectance without color. Thus, by way of example, the transmitted beam could be yellow and the reflected beam would be blue.

Now let it be assumed that the cell is activated by applying a voltage between the conducting layers to establish an electric field within the liquid crystal material. As is well known to those skilled in the art, providing an electric field in the liquid crystal material causes discontinuities in the molecular distribution. These discontinuities are represented by regions of changing indices of refraction to form scattering centers for light incident on the liquid crystal material. Using the same example with the blue light or beam being reflected off of the dichroic filter and the yellow light being transmitted, it is found that because of this scattering effect, the yellow beam is scattered by the liquid crystal material and, therefore, very little of the same reaches the total reflecting surface 22 so that it is not reflected back. For this reason, for all intents and purposes, the yellow beam or light becomes lost in the liquid crystal material. Thus, it can be seen that the effect of the display device, when it is activated, is to separate the transmitted and reflected components of the light beam which is received by the dichroic filter.

It has been found that when viewing such a display device, there are two modes of viewing, one which has been identified as the specular mode and the other of which has been identified as the diffuse mode. These two different viewing modes are from different positions of the viewer of the display devices as hereinafter described. The specular mode of viewing is represented by the position of the viewer as shown in FIG. 1 and also in FIG. 2. When the display device is inactivated and the viewer is looking at a specular reflection of an extended light source as, for example, from a lamp bulb 17 as shown in FIG. 1 or as from a white wall, as hereinbefore explained, will see a uniform white reflectance occurring from the addition of the transmitted beam $a$ and the reflected beam $b$. Even though there are two beams which are viewed by the eye, the eye cannot tell that the beams $a$ and $b$ are slightly displaced because of the very minute distance between the two members 11 and 12 as, for example, 0.001 of an inch.

Also, in the specular mode as shown in FIG. 2, when the display device or cell is activated, the liquid crystal material scatters incident light as hereinbefore explained. The result is that beams $a$ and $b$ no longer combine and the viewer only sees the reflected beam B because transmitted beam $a$ has been scattered within the liquid crystal material. Thus, if blue is reflected and yellow is transmitted, the viewer will only see blue because the transmitted yellow has been lost in the liquid crystal material. Thus, if only a portion of the cell has been activated, the portion where the cell has been activated will have the color of the reflection and will give the appearance of a smooth mirror, whereas the remainder of the cell which has not been activated will have a white appearance as described earlier from the summation of the reflected and transmitted beams.

In the diffuse mode of viewing, the position of the viewer is moved so that he does not see the specular reflection of the light source 17 which is represented by the arrow $b$ in FIG. 3. In this position, the viewer can only see light which is represented by the arrows $c$ which represent the light which is scattered by an activated area of the cell. It is in effect an extended source made up of many tiny scattering centers. Therefore, the activated area of the liquid crystal display device takes on the color of the transmitted color of the dichroic filter since that is the only light reaching the scattering centers. Thus, if the filter is transmitting yellow light, the appearance given off by the display device or cell will be yellow. The color display, however, will appear in the activated region of the display device much like an illuminated ground glass with the color of the transmission component of the dichroic filter through which the light passes. The inactivated region of a liquid crystal display device will appear dark assuming that only the light source 17 is present and there are no other diffusely reflecting parts of the display device. However, in actual practice, there are many sources of light, direct and reflected from objects within the room containing the display device and, therefore, the appearance of the diffuse mode is that of a color activated area represented by the transmitted color on a white background of an inactivated cell.

Utilizing the foregoing principles, a series of display devices or cells have been fabricated. All the cells utilize a back reflector of the total reflecting type of the type hereinbefore described.

For the coating 21, different series of dichroic filters were provided. Each, however, was overcoated with an indium oxide layer to provide the conducting layer for activation of the liquid crystal cell. The following dichroic filters were utilized:

| | |
|---|---|
| No. 1 | blue reflecting |
| | yellow transmitting |
| No. 2 | yellow reflecting |
| | blue transmitting |
| No. 3 | green transmitting |
| | magenta reflecting |
| No. 4 | green reflecting |
| | magenta transmitting |

The fabrication of dichroic filters to provide such characteristics is well known to those skilled in the art.

In all cases of the display devices or cells assembled, it was found that all worked both in the specular and diffuse modes. However, it was found that some worked better than others. This is due to the sensitivity of the human eye which sees best or has the highest sensitivity in the green region of the visible light spectrum. It is also due to the "pass band width" of the dichroic filters. For example, it was found that the best diffuse display was the yellow transmitting, blue reflecting dichroic. The reason for this is that the dichroic filter transmits the greatest amount of energy that is visible to the eye of the observer back to the scattering portion of the activated liquid crystal material. Thus, this display appeared the brightest to the observer. The green transmitting display device gave the poorest appearance because the filter had too narrow a band pass and thus there was insufficient energy transmitted back to be scattered by the liquid crystal material to reach the observer's eye to give a bright display.

Utilizing one of the examples, magenta transmitting and green reflecting dichroic filter, in the diffuse mode the color of transmission is obtained which is magenta and in the specular mode the color which is obtained is the color of the reflection which is green. In all cases it was found that a white reflector was utilized for the back reflector and a dichroic filter on the front member, the color transmitted by the dichroic filter is the color which appears in the diffuse mode and the reflected color of the dichroic is the color which appears in the specular mode.

It is, therefore, believed that the present invention will work with any color of dichroic filter as long as there is no absorption or a small amount of absorption of the nontransmitted color in the dichroic filter. It should be appreciated in connection with the foregoing that in the diffuse mode whatever light is reflected in the diffuse mode is lost as a signal. From the foregoing description of the display device and its mode of operation it cn be seen that the device or cell is one which is white when inactivated and which becomes colored when activated. However, it should be appreciated that it is also possible in connection with the present invention to utilize other combinations so that the display device has one color when inactivated and a different color when activated. For example, one could use a magenta (blue plus red) back reflector for the member 12 with a yellow transmitting/blue reflecting front dichroic filter. In the off or inactivated state, the display device would add a blue reflection from the front dichroic filter with the red portion of the yellow transmission from the rear dichroic filter because the magenta back reflector will not return the green part of the transmitted yellow component. Thus, the result is a magenta appearance when the display device is inactivated and a yellowish and red (orange) when the device is activated when viewing the same so that the diffuse mode can be observed. The back scattered yellow light will return from the diffuse mode plus the reflected scattered red to give this appearance. When viewing the specular mode, the same display device or cell would be magenta when inactivated and blue when activated.

A construction of such a cell in which an additional coating 36 has been provided as a part of the second member 12 to form a part of the display device or cell is shown in FIG. 4. Such a coating is a dichroic filter of the desired type with a conducting coating formed thereon as, for example, an indium oxide coating. In cases where the conducting layer is formed by a conducting coating on a dichroic filter, it is necessary that the conducting coating be substantially transparent to light. The transmitted beam is represented by the arrow $a$ and the reflected beam is represented by the arrow $b$ in FIG. 4.

Figure 6:
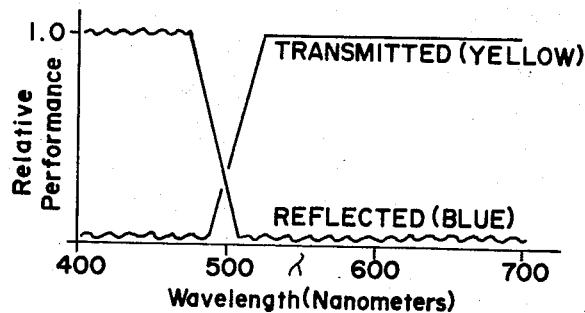
FIG. 6 is a curve showing the spectral performance of the filter on the front member of the display device shown in FIG. 4.

FIGS. 5 and 6 are curves showing typical spectral performance of the filters used in FIG. 4. Thus, FIG. 5 shows the characteristics for the back dichroic filter 36 which reflects the blue and the red to give a magenta, and FIG. 6 shows the curves for the dichroic filter 21 which is yellow transmitting and blue reflecting.

Figure 7:
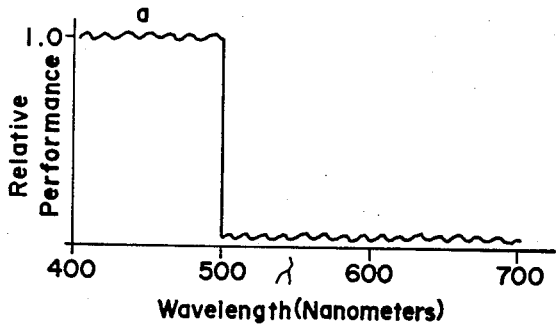
FIG. 7 is a curve showing the energy which is reflected by the front dichroic filter with the display device in an active state.
Figure 8:
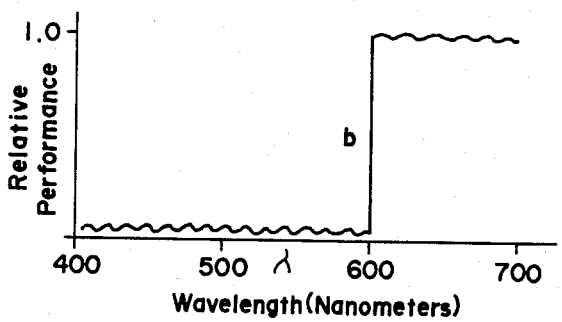
FIG. 8 is a curve which is a product of the curves in FIGS. 5 and 6 showing what is reflected by the rear dichroic filter when the device is in an active state.

When the cell or display device shown in FIG. 4 is in the inactive state, FIGS. 6, 7, 8 and 9 show what is occurring. FIG. 7 is a curve which shows what is reflected by the front dichroic filter 21 which, as shown, is blue. FIG. 8 is a curve showing what is transmitted by the front dichroic filter and reflected by the back dichroic filter 36. Yellow is transmitted but the green portion of the yellow is not reflected by the rear or back dichroic filter and, therefore, all that is reflected is the red portion of the transmitted yellow color to give the appearance to the eye of red as shown by FIG. 8 when the display device is being viewed to observe the spectral mode.

Figure 9:
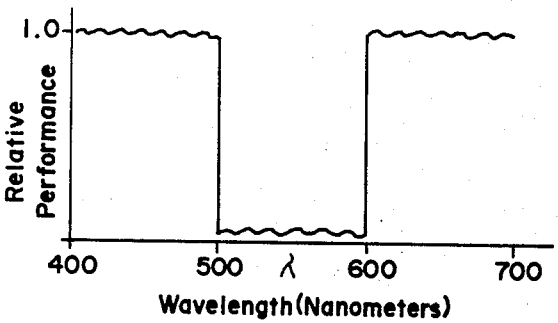
FIG. 9 is a composite curve which is a summation of the curves of FIGS. 7 and 8 showing the appearance of the display device in an inactive state when viewed in the spectral mode.

The combination of the curves shown in FIGS. 7 and 8 is shown in FIG. 9 to give a magenta appearance, the combination of the blue plus the red.

Figure 10:
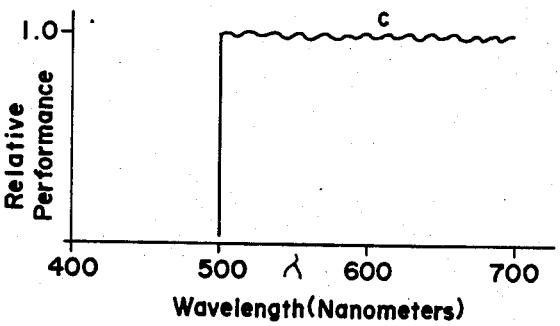
FIG. 10 is a curve showing the energy which is transmitted by the front dichroic filter and which is scattered directly back to the eye when the device is being viewed in the diffuse mode.
Figure 11:
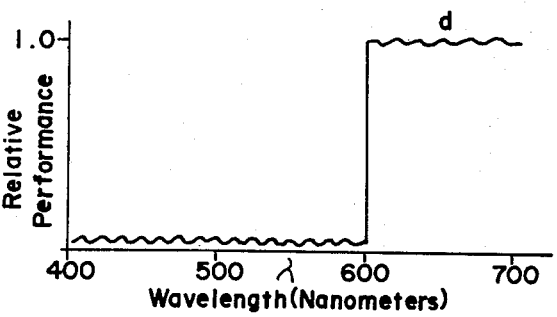
FIG. 11 is a curve showing the energy which is transmitted by the front dichroic filter scattered by the liquid crystal material and reflected from the back reflector to the eye when the device is viewed in the diffuse mode.
Figure 12:
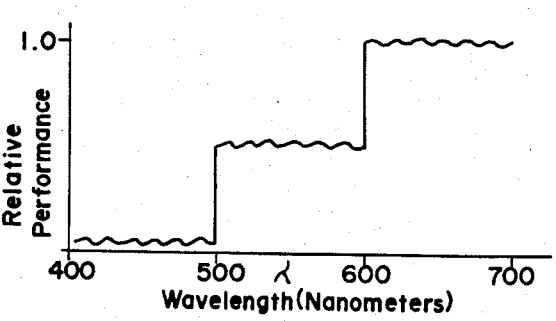
FIG. 12 is a composite curve which represents the sum of the curves shown in FIGS. 10 and 11 which is the total impression given to the viewer observing the device in the diffuse mode.

FIGS. 10, 11 and 12 show what is occurring when the cell is viewed to observe the diffuse mode of operation. When this is the case, the curves shown in FIG. 10 represent what is seen by the eye when in position to view the diffuse mode from the light which is transmitted by the front dichroic filter 21. Since yellow is being transmitted, this transmitted beam is scattered back to the eye as represented by the beam $c$ and gives a yellow appearance as given by the curve shown in FIG. 10.

With respect to the yellow transmitted light which is scattered by the liquid crystal material and then reflected off of the back dichroic filter 36, only the red is reflected as represented by the arrow $d$ in FIG. 4 and provides the waveform as shown in FIG. 11.

The summation of the light information which is received by the eye as shown by FIGS. 10 and 11 is combined as shown in FIG. 12 to provide a combination of yellow and red to give an overall orange appearance.

From the foregoing, it can be seen that the display device or cell shown in FIG. 4, when inactivated, will have a magenta appearance and when activated will have an orange appearance in the diffuse mode and a blue appearance in the specular mode.

In connection with the foregoing, it should be appreciated that the different colors obtained in the inactivated and activated states of the device or cell are obtained because of the scattering effect of the medium which is disposed between the first and second members. Although this scattering effect has been described as being obtained with liquid crystal material of the nematic type, certain cholesteric liquid crystal materials also provide the same function.

It should be appreciated that in connection with the foregoing display devices or cells that when desired, antireflection coatings can be utilized in the manner described in U.S. Pat. No. 3,736,047.

It is apparent from the foregoing that there has been provided a display device which is particularly adaptable for use with liquid crystal materials and a method which have a broad application when it is desired to provide a display device which has a different color when activated than when it is deactivated. This is particularly important where it is desired to introduce contrast and to make the display more visible. This is principally made possible by the use of a dichroic filter on the front member so that the light beam must pass through the dichroic filter before it enters into the region where the light beam is scattered. The display device is of a relatively simple construction even though relatively startling results are obtained.

It should also be appreciated that by putting more than one dichroic coating on the first member of the device that several colors could be produced in a single cell. For example, with a white back reflector and using a yellow transmitting/blue reflecting coating on half the cell and a green transmitting/magenta reflecting coating on the other half of the cell, we would produce such a display. When activated and viewed in the diffuse mode, half the display would appear yellow and the other half green. This would be a pattern on a "macro" scale where each different coated section can clearly be seen by the eye.

Similarly, by making patterns of dots on a very small "micro" scale by the use of masks, it is possible to obtain a multicolored display where individual components would not be visible but where a general area would have a certain color. By intermingling different colored dots, it is possible to produce the appearance of various colors to the viewer which would be mixtures of the actual colors used on a "micro" scale.

What is claimed is:

1. In a display device for use with a light beam, first and second spaced optical members, said first member being capable of transmitting light in the visible region, light reflecting means disposed on the second member, means capable of being activated disposed between the first and second members and having properties of transparency when not activated and scattering when activated, dichroic filter means disposed on the first member for transmitting one spectral region of the light beam in the visible region and reflecting another spectral region of the light beam in the visible region whereby when the means disposed between the first and second members is inactive, said display device has one color in the visible region and when said means disposed between the first and second members is activated the display device has a different color in the visible region.

2. A device as in claim 1 wherein said means disposed between said first and second members is a liquid crystal material together with means for applying an electric field to at least a portion of the liquid crystal material.

3. A device as in claim 1 wherein said light reflecting means carried by the second member is in the form of a reflector reflecting all colors to give an unaltered appearance.

4. A device as in claim 1 wherein said dichroic filter is formed to reflect different colors in different areas of the first member.

5. A device as in claim 4 wherein the areas are very small and interspersed to give the appearance of a mixture of colors.

6. A display device as in claim 1 together with a layer of conducting material carried by the dichroic filter means.

7. A display device as in claim 6 wherein said second member is in the form of a conducting metal sheet.

8. A display device as in claim 1 wherein said light reflecting means carried by the second member is in the form of a dichroic filter so that said device will change colors from the inactive to the active states which are different from white.

9. In a display device for viewing by a viewer with a source of light, first and second spaced members, said first member being capable of transmitting light in the visible region and having first and second surfaces with the first surface facing the source of light and the viewer, a dichroic filter disposed on the second surface of said first member, a electrically conductive coating disposed over said dichroic filter, light reflecting means disposed on said second member, said second member including means capable of carrying an electrical current, a liquid crystal material disposed between said first and second members and in contact with the conductive coating and said current carrying means of said first and second members, respectively said conductive coating and said current carrying means being adapted to be connected to a source of voltage to establish an electric field in the liquid crystal material so that when an electric field is not present, the display device gives one colored appearance in the visible region to the viewer and when an electric field is present in the liquid crystal material, a different colored appearance is given to the viewer in the visible region because of the scattering effect of the liquid crystal material on the light which is transmitted by the dichroic filter on the first member.

10. A display device as in claim 9 wherein said light reflecting means carried by the second member is a dichroic filter disposed on a surface of the second member so that the light reflected therefrom is reflected into the liquid crystal material.

11. A device as in claim 10 wherein the dichroic filter of the second member is disposed on the surface of the second member which is closest to the liquid crystal material.

12. A device as in claim 9 wherein said dichroic filter is formed to reflect different colors in different areas of said second surface of said first member.

13. A device as in claim 12 wherein the areas are very small with the colors provided by the areas being interspersed to give an apparent mixture of colors.

14. In a method for providing a visual display to the eye of a viewer utilizing energy from a light beam in the visible region comprising the steps of providing a liquid crystal material capable by activation of a change from a transparent optical state to a scattering optical state, establishing said liquid crystal material in an unactivated state, providing a dichroic filter, impinging said filter with a beam of incident light, whereby a first spectral portion of said incident light beam is reflected to said viewer, transmitting through said filter and said liquid crystal material a second spectral portion of said incident light beam, and reflecting at least a third spectral portion of said second spectral portion of light back through said liquid crystal material and said filter to said viewer, whereby the colored impression perceived by the viewer is the combination of said first spectral portion and said third spectral portion.

15. A method as in claim 14 further comprising the step of activating said liquid crystal material, whereby said liquid crystal material scatters said second and third light beam portions so that the colored impression perceived by the viewer is substantially said first spectral light portion.

16. A method as in claim 15, further comprising the step of adjusting the relative position of said filter and said liquid crystal material with respect to said viewer such that only said scattered second and third spectral portions are perceived by said viewer.

17. A method as in claim 14 wherein said at least spectral light portion comprises a distinct subportion of said second spectral portion of light.

18. In a method for providing a visual display to the eye of a viewer utilizing energy from a light beam in the visible region, providing a liquid crystal material, providing a dichroic filter, using the dichroic filter to reflect a spectral portion of the light beam to the eye of the viewer, transmitting another spectral portion of the light beam through the dichroic filter and into the liquid crystal material, and selecting one of first and second modes of operation, the first mode comprising reflecting at least a spectral portion of the transmitted spectral portion of the light beam back to the viewer so that the colored impression of the viewer is the combination of the spectral portion of the beam reflected to the viewer and the spectral portion of the transmitted beam which is reflected to the viewer, the second mode comprising scattering the transmitted spectral portion of the beam so that it cannot be seen by the viewer so that the colored impression perceived by the viewer is the color of the reflected spectral portion of the beam.

19. In a method for providing a visual display to the eye of a viewer utilizing energy from a light beam in the visible region, providing a liquid crystal material, providing a dichroic filter, reflecting a spectral portion of the light beam to the eye of the viewer by utilizing the dichroic filter, transmitting another spectral portion of the light beam through the dichroic filter and into the liquid crystal material, reflecting at least a spectral portion of the transmitted spectral portion of the light beam back to the viewer so that the colored impression perceived by the viewer is the combination of the spectral portion of the light beam reflected to the viewer and the spectral portion of the transmitted beam which is reflected to the viewer and thereafter activating the liquid crystal material to scatter the transmitted spectral portion of the beam so that the transmitted beam cannot be seen by the viewer so that the colored impression perceived by the viewer is the color of the reflected spectral portion of the beam.

20. In a method for providing a visual display to the eye of a viewer utilizing energy from a light beam in the visible region, providing a liquid crystal material which exhibits a transparent state when not activated and a scattering state when activated, providing a front dichroic filter and a rear reflector disposed on opposite sides of the liquid crystal material with the back reflector providing a specular reflection when the liquid crystal material is not activated, using the dichroic filter to split the light beam into two spectrally distinct beams, and activating and inactivating said liquid crystal material to obtain selective specular and diffuse reflection of one of said two spectrally distinct beams to thereby obtain optical contrast for the viewer.

* * * * *